(12) United States Patent
Martin Vicente et al.

(10) Patent No.: US 10,216,509 B2
(45) Date of Patent: Feb. 26, 2019

(54) CONTINUOUS AND AUTOMATIC APPLICATION DEVELOPMENT AND DEPLOYMENT

(71) Applicant: TUPL, Inc., Snoqualmie, WA (US)

(72) Inventors: Oscar Martin Vicente, Málaga (ES);
Pablo Tapia, Snoqualmie, WA (US);
Rafael Guerrero, Atlanta, GA (US);
Ricardo Ferrer, Málaga (ES)

(73) Assignee: TUPL, INC., Bellevue, WA (US)

( * ) Notice: Subject to any disclaimer, the term of this patent is extended or adjusted under 35 U.S.C. 154(b) by 225 days.

(21) Appl. No.: 15/074,562

(22) Filed: Mar. 18, 2016

(65) Prior Publication Data
US 2017/0269921 A1 Sep. 21, 2017

(51) Int. Cl.
*G06F 8/65* (2018.01)
*G06F 11/36* (2006.01)

(52) U.S. Cl.
CPC ............ *G06F 8/65* (2013.01); *G06F 11/3668* (2013.01)

(58) Field of Classification Search
CPC ..... G06F 8/60; G06F 8/61; G06F 8/63; G06F 8/64; G06F 8/65; G06F 8/67; G06F 8/68; G06F 8/70; G06F 8/71; G06F 8/72; G06F 8/76; G06F 9/455; G06F 9/45504; G06F 9/45533; G06F 9/45541; G06F 9/45545; G06F 9/4555; G06F 9/45558; G06F 11/36; G06F 11/3604; G06F 11/362; G06F 11/3664; G06F 11/3668; G06F 11/3672; G06F 11/3688; G06F 11/3692; G06F 2009/45562; G06F 2009/4557; G06F 2009/45575; G06F 2009/45591

USPC .............. 717/124–135, 168–178; 718/1, 100
See application file for complete search history.

(56) References Cited

U.S. PATENT DOCUMENTS

| | | | | |
|---|---|---|---|---|
| 5,694,540 A * | 12/1997 | Humelsine | ................ | G06F 8/71 714/33 |
| 6,769,114 B2 * | 7/2004 | Leung | ................... | G06F 11/368 714/E11.208 |
| 7,865,888 B1 * | 1/2011 | Qureshi | ................. | G06N 5/048 717/168 |

(Continued)

OTHER PUBLICATIONS

International Search Report and Written Opinion dated Jun. 9, 2017 from PCT Application No. PCT/US2017/023072, 9 pages.

*Primary Examiner* — Andrew M. Lyons

(57) ABSTRACT

Integrated application development and deployment may speed up application development. The continuous integration component of a software development engine may generate a completed version of a deployment project in a development environment by at least generating an updated version of a first project element concurrently with integrating an initial version of the first project element with an initial version of a second project element. The updated version of the first project element is then integrated with the initial version of the second project element to generate the completed version. An orchestration component may configure a production environment to execute a production image that is a copy of a development image that is created from the completed version, in which the production environment is mirrored by the development environment. The continuous integration tool may also include an automatic deployment component that deploys the production image into the production environment for execution.

24 Claims, 8 Drawing Sheets

(56) References Cited

U.S. PATENT DOCUMENTS

| | | | | |
|---|---|---|---|---|
| 8,589,203 B1* | 11/2013 | Collins | G06Q 10/00 | 705/7.12 |
| 8,627,296 B1* | 1/2014 | Picard | G06F 11/3684 | 717/124 |
| 8,819,108 B2* | 8/2014 | Deng | H04L 67/42 | 709/201 |
| 8,856,724 B2* | 10/2014 | Somani | G06F 8/30 | 717/101 |
| 9,183,123 B2* | 11/2015 | Spektor | G06F 11/36 | |
| 9,454,459 B2* | 9/2016 | Bigwood | G06F 11/3624 | |
| 9,612,821 B2* | 4/2017 | Iyer | G06F 8/65 | |
| 9,760,366 B2* | 9/2017 | Frank | G06F 8/65 | |
| 2005/0114829 A1* | 5/2005 | Robin | G06Q 10/06 | 717/101 |
| 2007/0083859 A1* | 4/2007 | Fussell | G06F 8/71 | 717/168 |
| 2007/0250574 A1* | 10/2007 | Tseitlin | G06F 8/61 | 709/205 |
| 2007/0288903 A1* | 12/2007 | Manglik | G06F 8/60 | 717/124 |
| 2010/0269121 A1* | 10/2010 | Montesissa | G06F 8/656 | 719/313 |
| 2013/0152047 A1* | 6/2013 | Moorthi | G06F 11/368 | 717/124 |
| 2013/0266292 A1* | 10/2013 | Sandrew | H04N 9/79 | 386/282 |
| 2014/0040438 A1* | 2/2014 | Donahue | G06F 9/455 | 709/220 |
| 2014/0089896 A1* | 3/2014 | Mansour | G06F 8/447 | 717/122 |
| 2014/0189641 A1* | 7/2014 | Anderson | G06F 8/60 | 717/110 |
| 2015/0026121 A1* | 1/2015 | Shani | G06F 11/3688 | 707/609 |
| 2015/0106790 A1* | 4/2015 | Bigwood | G06F 11/3624 | 717/127 |
| 2015/0220426 A1* | 8/2015 | Spektor | G06F 11/36 | 717/131 |
| 2015/0227449 A1* | 8/2015 | Kuang | G06F 8/71 | 717/121 |
| 2015/0378717 A1* | 12/2015 | Jacob | G06F 8/65 | 717/124 |
| 2016/0253172 A1* | 9/2016 | Shani | G06F 8/30 | 717/101 |
| 2017/0115976 A1* | 4/2017 | Mills | G06F 8/71 | |
| 2017/0180487 A1* | 6/2017 | Frank | H04L 67/16 | |
| 2018/0253296 A1* | 9/2018 | Brebner | G06F 15/16 | |

* cited by examiner

CONTINUOUS AND AUTOMATIC APPLICATION DEVELOPMENT AND DEPLOYMENT

BACKGROUND

There are many open source software development tools on the market today. However, a software developer that desires to create an integrated software solution using these software development tools may spend a considerable amount of effort not only individually configuring each software development tool, but also assembling the software development tools to execute together seamlessly. Further, because the integrated software solution is created in a development environment that differs from a production environment, the software developer often encounters unexpected problems when the integrated software solution is deployed for use. Such unexpected problems may be especially detrimental when the integrated software solution is a mission critical application, such as an application that operates or manages telecommunication or utility infrastructures.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques for performing continuous application development and automatic application deployment. In various embodiments, the techniques may make use of a software development engine that includes a continuous integration tool and an automatic deployment tool. The continuous integration tool may provide a development environment that supports non-linear application development via distributed revision control. Accordingly, the continuous integration tool may be used to develop software for deployment to a production environment according to project specifications of a deployment project. The project specifications for a deployment project may include a descriptive file that defines the corresponding deployment scenario. The continuous integration tool may automatically test the completed deployment project using project test suites and the test data. Upon the successful completion of testing, the continuous integration tool may generate a development image of the software for storage in an internal repository of the development environment.

Subsequently, the automatic deployment tool may transfer the development image to an external repository of a production environment for execution. In various embodiments, the automatic deployment tool may automatically configure execution settings based on user inputs. The automatic deployment tool may further use an orchestration tool to configure the computing nodes of the production environment to execute the development image. In some instances, the automatic deployment tool may auto scale the execution of the development image in the computing nodes according to service demands and/or service agreements.

The techniques for continuous application development and automatic application deployment may integrate application development and deployment processes. Accordingly, the techniques may speed up an application development process. For example, by implementing continuous integration, the techniques may make it possible to reduce iteration time of application development. Further, the techniques may enable a software developer to test the features of a software solution in a development environment that mirrors a production environment for the deployment of the software solution. Thus, unexpected problems at the time of the deployment may be reduced or eliminated. Such reduction or elimination of unexpected deployment problems may be especially useful for the deployment of mission critical applications, such as applications that operate or manage telecommunication or utility infrastructures. The techniques described herein may be implemented in a number of ways. Example implementations are provided below with reference to the following FIGS. 1-5.

Example Architecture

Figure 1:
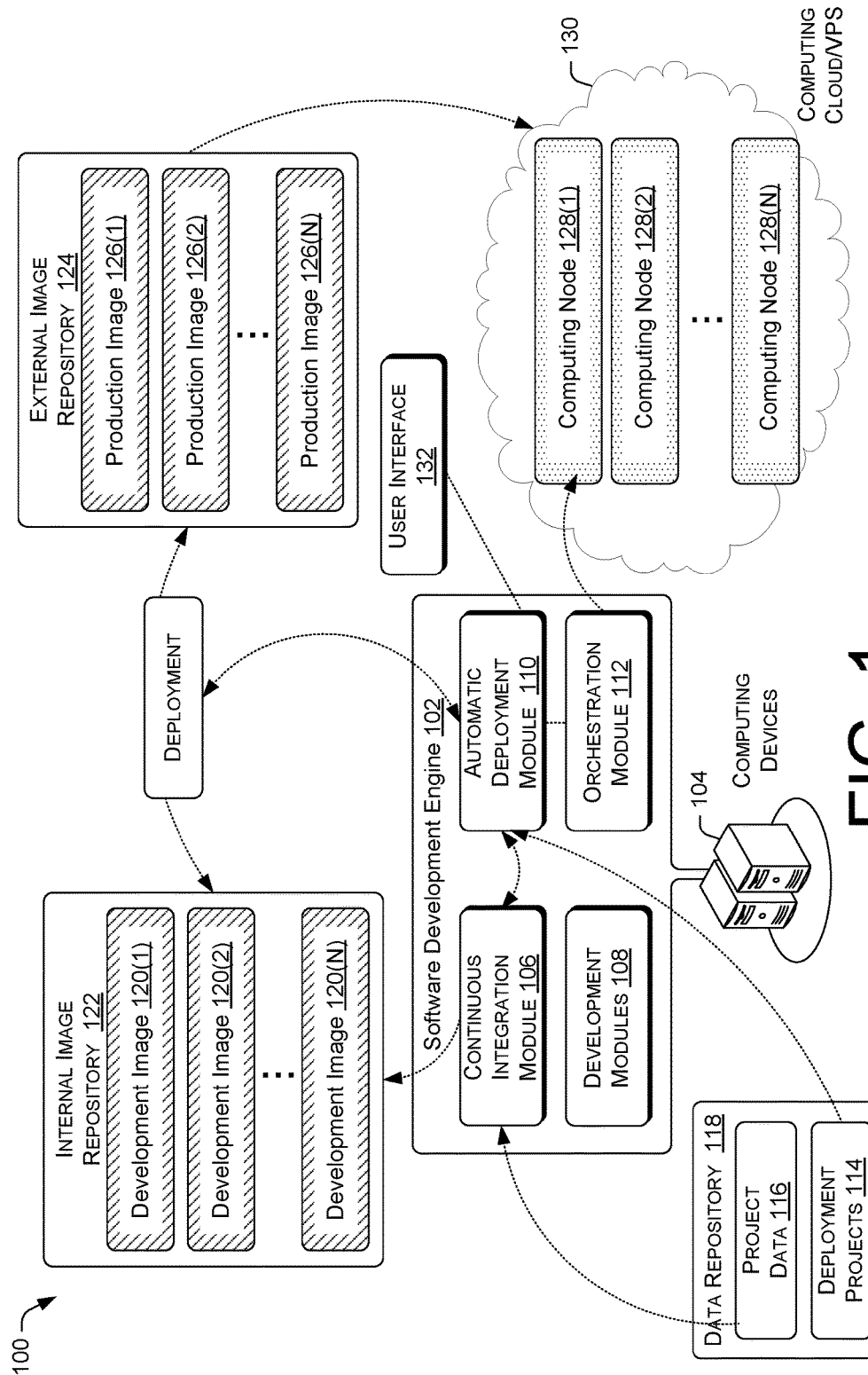
FIG. 1 illustrates an example architecture for performing continuous application development and automatic application deployment.

FIG. 1 illustrates an example architecture 100 for performing continuous application development and automatic application deployment. The architecture 100 may include a software development engine 102 that executes on one or more computing devices 104. The computing devices 104 may include general purpose computers, such as desktop computers, tablet computers, laptop computers, servers, and so forth. However, in other embodiments, the computing devices 104 may include smart phones, game consoles, or other electronic devices that are capable of receiving inputs, processing the inputs, and generating output data. The software development engine 102 may provide a development environment.

The software development engine 102 may include continuous integration module 106, development modules 108, an automatic deployment module 110, and an orchestration module 112. The modules may include routines, program instructions, objects, and/or data structures that perform particular tasks or implement particular abstract data types. The continuous integration module 106 may be used to develop multiple deployment projects 114 from the project data 116. The continuous integration module 106 may receive project data 116 from a data repository 118. The data repository 118 may be managed by a source code management module. The project data 116 may include source code for applications and application components, source code of peripheral applications and operating systems, deployment project specifications for the deployment projects 114, project test suites and test data, and/or so forth. The source code for the applications and the application components may be organized into libraries. The project specification for a deployment project may include a descriptive file that defines the corresponding deployment scenario. For example, the descriptive file may specify the type and number of hosts that are used to execute software of the deployment project, the types and sources of data to be processed by the software, and/or so forth.

The continuous integration module 106 may support non-linear application development via distributed revision control. Such non-linear application development may also make use of other development modules 108. The developments modules 108 may include software development applications, a project management module, a binary repository manager, and/or so forth. In various embodiments, software to be developed for a deployment project may be organized into a master branch, and each feature of the deployment project may be separated into an individual branch. In this way, a feature of the deployment project may be developed by a software developer in isolation to avoid collision with the work of other software developers. The individual branches may be merged into the master branch over time until the software for the deployment project is completed. The continuous integration module 106 may automatically test each version of the deployment project as the individual branches are progressively merged into the master branch until a final version of the deployment project is achieved. Each version of the deployment project may be tested in the development environment using project test suites and test data, in which the development environment mirrors a production environment for the deployment of the final version.

Upon the successful completion of the deployment project, the continuous integration module 106 may generate a development image that is suitable for execution on computing nodes in the form of virtual machines or software containers. The development image may include a package of application components, applications, operating system, and/or peripheral applications that are executed to process data and/or perform tasks. As used herein, virtual machines may include virtual engines (VE) and virtual private servers (VPS). A software container refers to an isolated virtual user-space instance that may behave as a real server. For example, forms of software containers may include Docker containers developed by Docker, Inc., Drawbridge containers developed by the Microsoft Corporation, LXD containers developed by Canonical Ltd., and/or so forth. Accordingly, the continuous integration module 106 may be used to generate development images 120(1)-120(N) for the deployment projects 114. Development images 120(1)-120(N) may be stored in an internal image repository 122 of the development environment, for which access is limited to the software developers that have access to the software development engine 102.

The automatic deployment module 110 may deploy the development images 120(1)-120(N) into an external image repository 124 as production images 126(1)-126(N). In various embodiments, the external image repository 124 may be accessible to an end user of the production images 126(1)-126(N). Each of the production images 126(1)-126(N) may be executed in a production environment that is provided by one or more containers of the computing nodes 128(1)-128(N) in a computing cloud 130. As such, the automatic deployment module 110 may be equipped with a user interface 132 that enables a user to select specific production images for execution in the production environment.

The automatic deployment module 110 may initiate the execution of a production image in the production environment based on multiple execution settings. For example, the execution settings may include the location of the repository where the production image is located, the amount of the computing and memory resources that are to be allocated for the execution of the production image in the production environment, the type and source of data to be processed using the production image, the set of actions to be performed on the source data by the production image, and/or other execution parameters for the development image. For example, the execution parameters may include application memory allocation thresholds, computing resource allocation thresholds, third-party software to support the execution of the production image, permissions and privileges used by the production image and the third-party software, and/or so forth. In various embodiments, the automatic deployment module 110 may configure the execution settings based on inputs received via the user interface 132. Subsequently, a user may input an execution command that causes the automatic deployment module 110 to initiate the execution of the production image in the production environment.

In various embodiments, the sources of data to be processed by production images may be stored in data containers, such as data volumes that reside in different storage directories. For example, a data container may be a Docker data volume container developed by Docker, Inc., or a data container that is developed by other companies, such as the Microsoft Corporation or Canonical Ltd. The data containers may enable the sharing and the reuse of data by multiple software containers to ensure data persistency. In this way, the storage of data may be decoupled from the processing of data. The scaling of data containers and software containers for a deployment project may differ, i.e., these two types of containers may not be scaled at the same rate and/or to the same level during the execution of a production image in a production environment. For example, a greater number of software containers may be deployed to process a fewer number of data volume containers, or vice versa, based on nature of the data to be processed, data output specifications, and/or so forth.

In some instances, the user interface 132 may be a graphical user interface that provides user interface controls that include drop down menus, selection buttons, checkboxes, sliders, and/or so forth. Accordingly, a user may enter the execution settings and initiate execution via the graphical user interface. However, in other instances, the user interface 132 may be a command line interface that receives the executing settings and the execution request as commands or scripts. In various embodiments, the user interface 132 may be a standalone application interface or a web interface that is accessible via a web browser.

The orchestration module 112 may be triggered by the automatic deployment module 110 to configure the production environment for the execution of a production image. In various embodiments, the orchestration module 112 may perform different orchestration tasks. Such tasks may include creating and provisioning computing nodes according to computing resource demand, booting up third-party services and applications, assign Internet Protocol (IP) addresses to access applications and data, mapping of slave computing nodes to host computing nodes, and/or so forth. In some instance, the orchestration module 112 may perform the orchestration tasks based on inputs that are received via a user interface. Alternatively, the user interface may enable a user to view or modify the orchestration settings for the production environment.

In some embodiments, the automatic deployment module 110 may perform automatic scaling for the deployment of a production image in the production environment. For example, an end user of the production image may have a service level agreement (SLA) that specifies a particular data output response time, data output capacity over a time period, a task completion time, or other quality of service (QoS) parameters. Accordingly, the automatic deployment module 110 may detect that the execution of a production image on one or more current computing nodes is falling below one or more QoS parameters. In response, the automatic deployment module 110 may use the orchestration module 112 to create and/or provision additional computer nodes of the computing cloud 130 to execute additional copies of the production image to seamlessly augment computing capacity. In this way, the automatic deployment module 110 may remedy the failure to meet one or more QoS parameters of the SLA. On the other hand, the automatic deployment module 110 may on occasion detect reduced computing resource demand for executing the production image. On such occasions, the automatic deployment module 110 may command the orchestration module 112 to terminate one or more computing nodes that are executing the production image. Thus, the automatic deployment module 110 may free up computing resources for performing other computing tasks. Alternatively, instead of the computing cloud 130, the production image may be deployed to a production environment that is provided by internal servers of an organization or entity, or a production environment that is provided using a combination of internal servers and cloud servers. In some instances, the internal servers may include legacy servers of the organization or entity that store data in a legacy format. In such instances, the production image may include data processing algorithms that process and transform the data in the legacy format to a standard format for additional processing by contemporary applications. The contemporary applications may include applications of the organization or entity, or external applications controlled by a third-party.

The automatic deployment module 110 may include monitoring algorithms that monitor the deployment of productions images into the production environments. The monitoring algorithm may generate alerts in response to faults in a deployment. The faults may include the failure of computing node hardware and/or software, communication failure between the computing nodes, shortage or misallocation of memory and processing power, loss of source data being processed, corruption of a production image, and/or so forth. The alerts may be presented to a user via the user interface 132 and/or a user interface of a computing device that controls the production environment.

In some embodiments, a monitoring algorithm may initiate automated remediation responses, in which the responses may attempt to resolve or bypass the problems associated with the deployment in a self-organized way. For example, the remediation responses may include designating another development image as a production image in an instance where the initial production image is corrupt, or perform a reboot or a recovery of one or more computing nodes in case of computing node failure. In other examples, the remediation responses may include accessing a backup data container when access to a source data container is lost, switch to alternative communication links between computing nodes when communication failure occurs, etc.

Each of the computing devices 104 may equipped with a communication interface, one or more processors, memory, and hardware. The communication interface may include wireless and/or wired communication components that enable the server to transmit data to and receive data from other networked devices. Each of the processors may be a single-core processor, a multi-core processor, a complex instruction set computing (CISC) processor, or another type of processor.

The memory may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The hardware may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

Example Application Development Components

Figure 2:
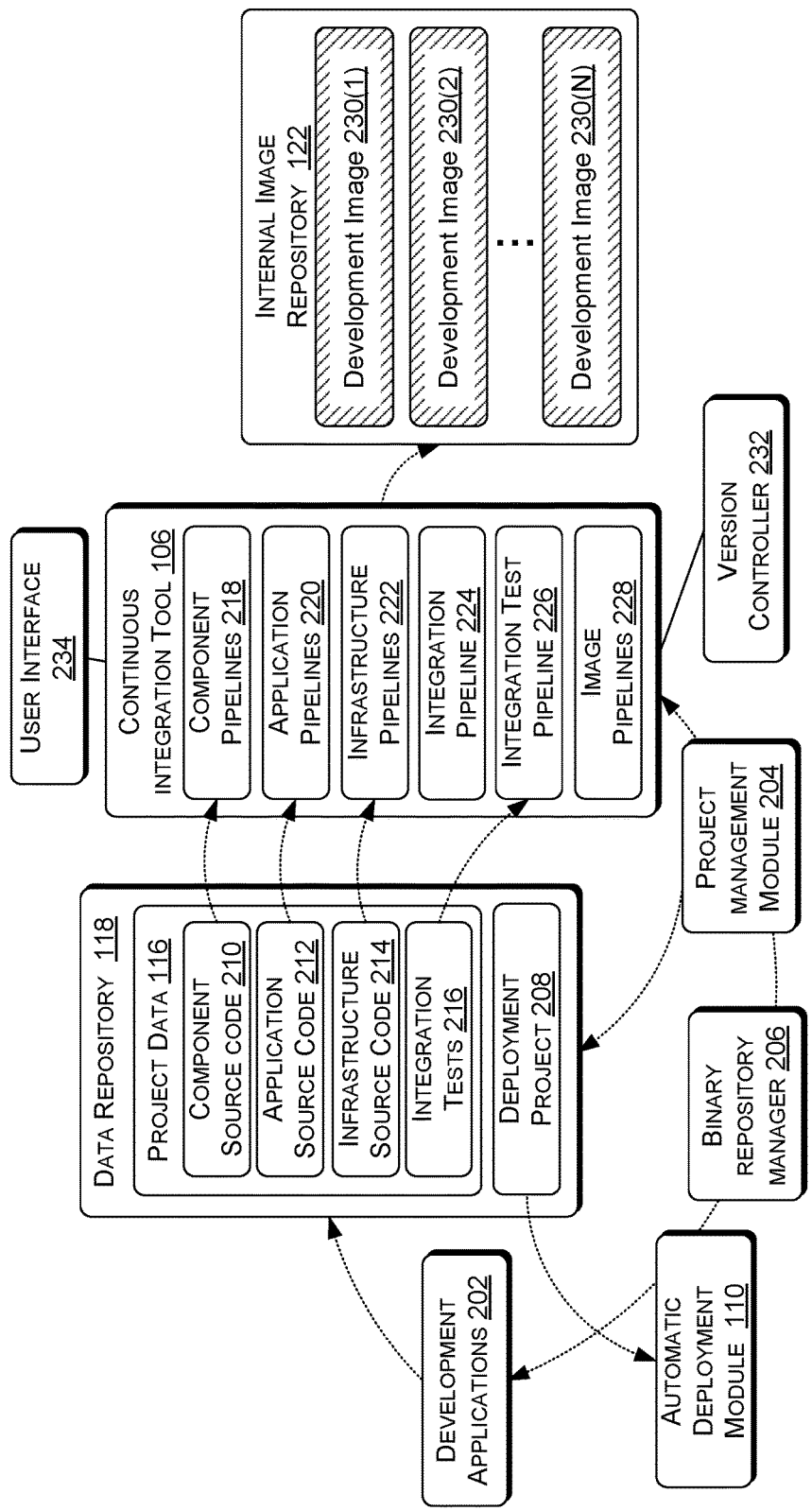
FIG. 2 is a block diagram showing various components of a software development engine for performing continuous application development.

FIG. 2 is a block diagram showing various components for performing continuous application development. The components may include the development applications 202, the project management module 204, the binary repository manager 206, and the continuous integration module 106. The development applications 202 may include script authoring applications, source code editors, software development kits (SDKs), and/or other applications that are used to create, modify, and develop source codes for software applications, software applets, software packages, software platforms, operating systems, etc. In some scenarios, the SDKs may be used to support external development of project components for a deployment project by a third-party developer. The SDK may include application programming interfaces (APIs), software libraries, scripts, and/or other tools that may be used to develop software project components.

The project management module 204 may be used to plan, organize, and schedule the development of a software application for a deployment project 208. In various embodiments, the project management module 204 may support build automation and/or distributed builds. For example, the project manager module 204 may use machine learning to analyze source code dependencies and relationship to implement distributed builds of applications and application components. The binary repository manager 206 may be use to optimize the download and use of binary files by multiple software developers during application development.

Source code may be built into new binary files via continuous integration during application development. Accordingly, the binary repository manager 206 may be used to manage the distribution, revision, and release of binaries for use by software developers. By using these modules, the software developers may generate component source code 210, application source code 212, and infrastructure source code 214 for the deployment project 208. The generated source codes may be uploaded into the data repository 118.

The continuous integration module 106 may include multiple pipelines that are used to convert the sources code for a deployment project into a corresponding development image, such as one of the development images 120(1)-120(N). The pipelines of the continuous integration module 106 may include component pipelines 218, application pipelines 220, infrastructure pipelines 222, an integration pipeline 224, an integration testing pipeline 226, and an image pipeline 228. Each of the pipelines may include a set of data processing elements connected in series, in which the output of one element is the input of a subsequent element in the pipeline. In various embodiments, the elements of a pipeline, as well as the pipelines themselves, may be executed in serial, in parallel, in a time-sliced fashion, and/or so forth.

The data repository 118 may store project data 116 that includes component source code 210, applications source code 212, infrastructure source code 214, and integration tests 216. The component source code 210 and the applications source code 212 may be checked into the data repository 118 by software developers. The infrastructure source code 214 may code support applications that support the execution of the source code. For example, the infrastructure source code 214 may include source code for an operating system, an application execution platform, and/or so forth. The integration tests 216 may include test suites that are designed to test the execution of various versions of the deployment project.

The component pipelines 218 may compile the component source code 210 into versions of application components. Each of the component pipelines 218 may be used to create specific application component for a different computing platform architecture. For example, a component pipeline may be used to compile the source code of a Java file for Java environment, or compile the source code of a dynamic link library file for a Windows environment. The component pipelines 218 may also provide test suites for testing each compiled version of an application component in the development environment.

The application pipelines 220 may compile the application source code 212 that are in the data repository 118. In various embodiments, the application source code 212 may code an application, a portion of the application, or a feature of the application. Accordingly, the application pipelines 220 may be used to compile an application in its entirety, at least one portion of the application, or a feature of the application for different versions of the development project. Additionally, the application pipelines 220 may be used to compile source codes for multiple application or application features that provide similar services or functionalities in different production environments. For example, applications that provide similar services or functionalities may be generated for a Java environment, a Windows environment, etc. The application pipelines 220 may also provide test suites for testing each compiled version of an application or an application portion in the development environment.

Furthermore, the infrastructure pipelines 222 may be used to compile the source code for infrastructures, such as operating systems, application execution platform, or other peripheral applications that support the execution of the application components and/or applications. The infrastructure pipelines 222 may also provide test suites for testing each compiled version of an infrastructure in the development environment.

The integration pipeline 224 may integrate versions of applications, application components, and infrastructure into a deployment project. The integration pipeline 224 may perform such integration under the command of a version controller 232. The version controller 232 may track the various versions of the applications, application components, and infrastructures. The integration test pipeline 226 may perform the integration tests 216 to ensure that each version of a deployment project meets corresponding project specifications, and ultimately the entire application is ready for deployment as a production image to a production environment. The integration tests 216 may include test suites that validate a version of the deployment project in a development environment, in which the development environment mirrors the production environment. In other words, the development environment may have all or nearly all of the characteristics of the production environment. For example, the development environment and the production environment may include computing nodes in the same computing cloud cluster that execute the same software platform. In another example, the development environment and the production environment may include computing nodes in different computing cloud clusters, in which the computing nodes have the same performance characteristics and are executing the same software platform. Accordingly, if the version controller 232 determines that a version of the deployment project passes a set of one or more integration tests, the source code associated with that version of the deployment project may be deemed to be complete. However, if the version controller 232 determines that a version of the deployment project fails an integration test, the continuous integration module 106 may send a notification for the corresponding source code to be further modified or corrected via the development applications 202.

In the event that the version controller 232 determines that a final version of the deployment project successfully passes the integration test suite, the continuous integration module 106 may use the image pipelines 228 to create a corresponding development image. A development image may include an infrastructure (e.g., a particular operating system, one or more peripheral applications, and/or application execution platform). The development image may further include one or more application components and one or more applications. For example, a development image may include one or more application components and an application that collectively provides a service. In another example, a development image may include multiple applications that are batched together to perform a two-step task. In an additional example, a development image may include an application component that passed a set of tests and an existing application, or vice versa. In another example, a development image may include an application component that passed a set of tests and an existing infrastructure.

The image pipeline 228 may be used to generate multiple development images that provide similar services or functionalities in different production environments, such as the development images 230(1)-232(N). The different production environments may have different computing resources, may be supported by different network infrastructure, may comply with different regulatory standards, and/or so forth. Subsequently, the continuous integration module 106 may inform the automatic deployment module 110 that that a deployment image is production environment ready.

The pipelines of the continuous integration module 106 may operate concurrently to convert source codes into deployment images. In various embodiments, the version controller 232 of the continuous integration module 106 may monitor the component source code 210 and the application source code 212 of the deployment project 208 as they are uploaded into the data repository 118. At each point that the version controller 232 determines that the source code for an application component, application, or infrastructure has been uploaded, the version controller 232 may use a pipeline to compile the source code into a version for testing. The testing may include individual deployment tests for the features that are encoded by the source code, in which the tests are endurance, stress, and/or performance tests. The testing may be performed in a development environment that mirrors a production environment. Thus, if the compiled source code at that point passes the one or more tests, the version controller 232 may determine that the particular version is ready for integration with additional source code. However, if the compiled source code at that point fails the testing, version controller 232 may generate a notification to a software developer. In response to the notification, the software developer may generate a new version of the source code. The new version of the source code is then fed into the pipeline for compiling and testing.

Through the use of multiple pipelines for the compiling and testing of applications, application components, and infrastructure, the version controller 232 may enable the concurrent compilation and testing of multiple versions of application components, applications, and/or infrastructure. For example, while a first application component pipeline is compiling and testing a version of application component, a second application pipeline may be compiling and testing a version of an application. Further, a third infrastructure pipeline may be compiling and testing a version of an infrastructure in the form of an operating system. In another example, multiple application pipelines may concurrently compile multiple versions of application components, multiple versions of applications, or multiple versions of infrastructures.

Further, the version controller 232 may also integrate versions of applications, application components, and infrastructure into a deployment project even when new versions of these elements are being created. For example, the version controller 232 may be using an integration pipeline to integrate a first version of an application component with versions of an application and an infrastructure to create a deployment project, while concurrently a second updated version of the application is being compiled and tested by an application component pipeline. In another example, the version controller 232 may be using an integration pipeline to integrate a first version of an application with versions of an application component and an infrastructure to create a deployment project, while concurrently a second updated version of the application is being compiled and tested by an application component pipeline. Once versions of one or more applications, one or more application components, and one or more infrastructures have been integrated into a final version of the deployment, the version controller 232 may perform integration tests on the final version via an integration test pipeline.

Following the successful integration testing of the deployment project, the version controller 232 may convert the source code of the final version into a development image that is to be eventually deployed into a production environment for execution. The source code for the previous versions of the deployment project may be discarded by the version controller 232. However, if the source code of a version of the deployment project fails integration testing at any point, the version controller 232 may request that the responsible software developer modify the source code to remedy errors in the source code.

In various embodiments, a software developer may interface with the continuous integration module 106 via a user interface 234. The user interface 234 may be a standalone application interface or a web interface that is accessible via a web browser. The user interface 234 may enable the software developer to select deployment projects to build and test, view test results, view application components and components in each deployment project, and/or so forth. The user interface 234 may be further used to select when a production image is to be deployed into a production environment. For example, the user interface 234 may include options for automatically or manually triggering the automatic deployment module 110 to deploy a production image into a production environment. Accordingly, the selection of automatic triggering may cause the production image to be deployed as soon as its deemed to have passed testing, while a selection of manual triggering means that the production image is to be deployed upon a manual command that is inputted by a user into a user interface.

The modules for performing application development as described in FIG. 2 may enable software application to be developed using an iterative and incremental agile software development methodology, commonly referred to scrum. For example, the use of multiple pipelines may enable software developers to work on the source code for the multiple features of the deployment project, such as an application component and an application, in parallel. The use of the multiple pipelines may also enable a newer version of a deployment project to be developed even as an older version is being prepared for deployment. Such concurrent development may speed up the application development process.

Example User Interfaces

Figure 3:
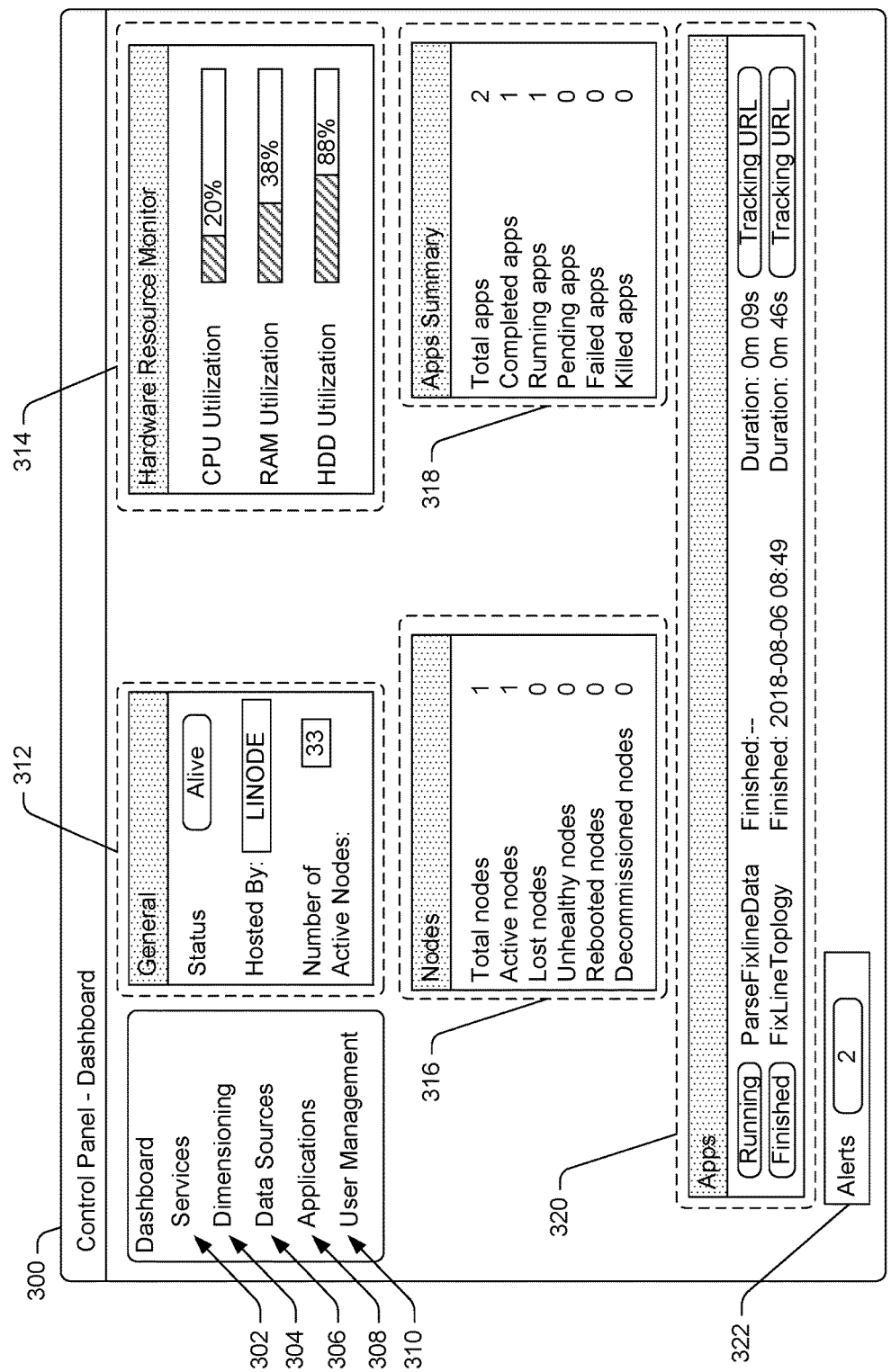
FIG. 3 is an illustrative user interface for monitoring automatic application deployment.

FIG. 3 is an illustrative user interface for monitoring automatic application deployment. The user interface 300 may be provided by the automatic deployment module 110 for the purpose of monitoring the deployment of a production image into a production environment. The user interface 300 may include a services menu item 302, a dimensioning menu item 304, a data sources menu item 306, an application menu item 308, and a user management menu item 310. The service menu item 302 may be activated to display a list of services that are provided by a production image in a production environment. In various instances, the services may include data collection services, data parsing services, data analysis services, data reporting services, and/or data storage services. For example, such services may be used to identify network deficiencies in a telecommunication network, identify energy consumption patterns for a utility company, identify network bottlenecks for an online data distribution service, and/or so forth.

The dimensioning menu item 304 may be activated to show a user interface that enables a configuration of the number of computing nodes to execute the production image. In various embodiments, the user interface may enable a user to designate a specific number of computing nodes, set upper or lower threshold limits for the number of computing nodes, or activate auto scaling to set the number of computing nodes according to service demand or a SLA.

The data sources menu item 306 may be activated to display a user interface that enables a user to select the source of the data to be processed by the services. For example, the source may be a local file directory, a cloud storage location, one or more specific data generation devices, and/or so forth. The applications menu item 308 may be activated to show a list of applications that are used to provide the services. In this way, the user may activate or disable one or more application to change the nature of analysis provided by the services, the characteristics of the output data provided by the services, and/or so forth. The user management menu item 310 may be activated to display a user interface for managing the access privileges of the users to the services. For example, access privileges to a service may be granted or revoked for different users, and different levels of access may be granted to the different users. For example, the access levels may include administrator level access, privileged user access, or restricted user access in which each access level grants increasingly lower amounts of access to functionalities and features of the services.

The user interface 300 may further display a general status section 312, a hardware resource monitor section 314, a computing nodes section 316, an application summary section 318, an application status section 320, and an alerts section 322. The general status section 312 may provide the status of a service, the host location of the service, the number of active computing nodes that are associated with the service, the statuses of the service and associated services. For example, a status of the service may be active or inactive. The host location may show the local or cloud location from which the services are being provided. The number of active nodes may indicate a quantity of the computing nodes that are used to execute applications to provide the service. The hardware resource monitor section 314 may show the amount of allocated processing power being consumed, the amount of working memory being consumed, and the amount of long term storage memory being consumed. The computing nodes section 316 may show statuses for the computing nodes that are being used to execute a service. The information shown in the section may include number of total nodes, number of active nodes, number of lost nodes, number of unhealthy nodes, number of rebooted nodes, and number of decommissioned nodes. The application summary section 318 may show the statuses of the applications that are used to implement a service. The information shown in the section may include total number of applications, number of completed applications, number of running application, number of pending applications, number of failed applications, and number of killed application.

The application status section 320 may show additional information on specific applications. For example, this section may show whether each application is executing or finished executing, the execution completion time, the duration of execution, and so forth. The alerts section 322 may show alerts that are generated as a result of faults with the deployment of the production image. The faults may include the failure of computing node hardware and/or software, communication failure between the computing nodes, shortage or misallocation of memory and processing power, loss of source data being processed, corruption of a production image, and/or so forth.

Figure 4:
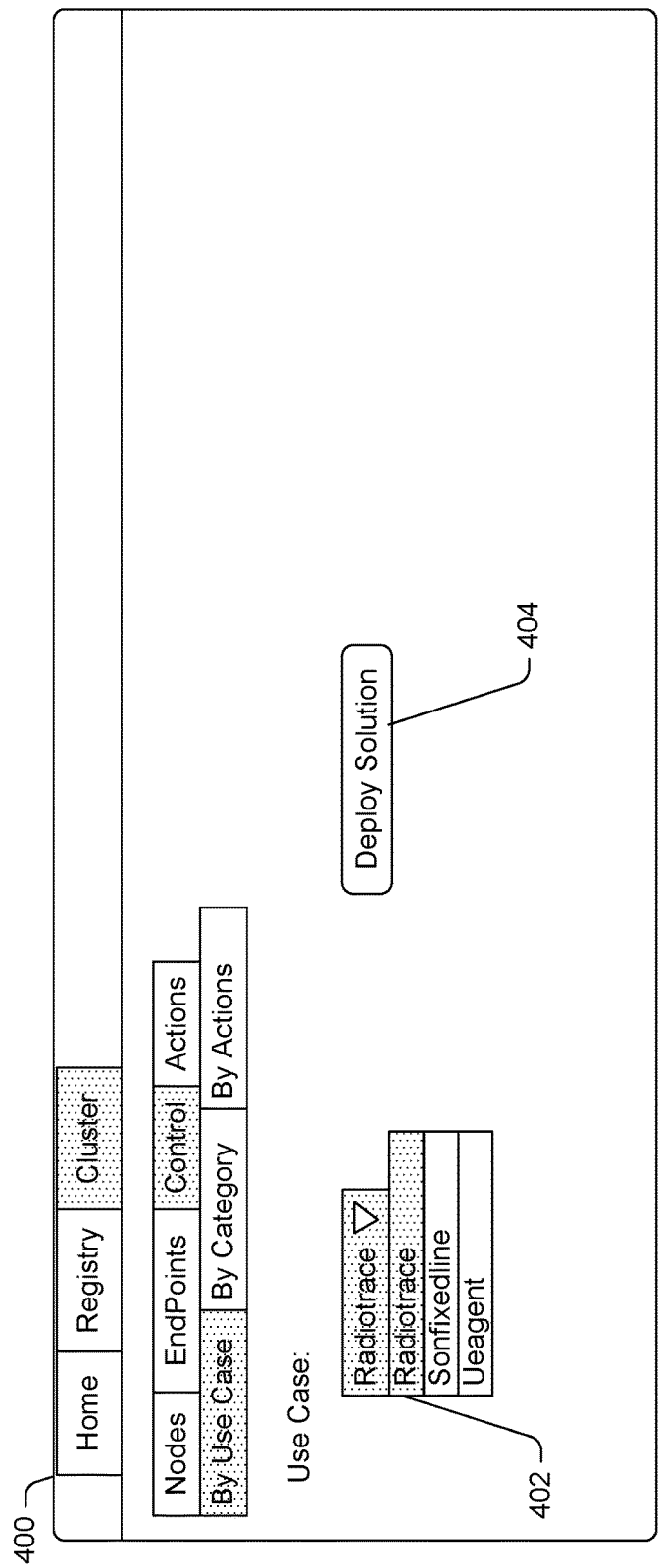
FIG. 4 is an illustrative user interface for configuring the deployment of a production image into a production environment.

FIG. 4 is an illustrative user interface 400 for configuring the deployment of a production image into a production environment. The user interface 400 provides settings for controlling the number of computing nodes to be implemented, the type of applications to be implemented, the types of services to be implemented, etc., in order to deploy the production image into a production environment. For example, the user interface 400 may enable the implementation of a "radio trace" application 402. Following the implementation of the appropriate settings, a user may activate the deploy solution control 404 to deploy the production image into the production environment.

Figure 5:
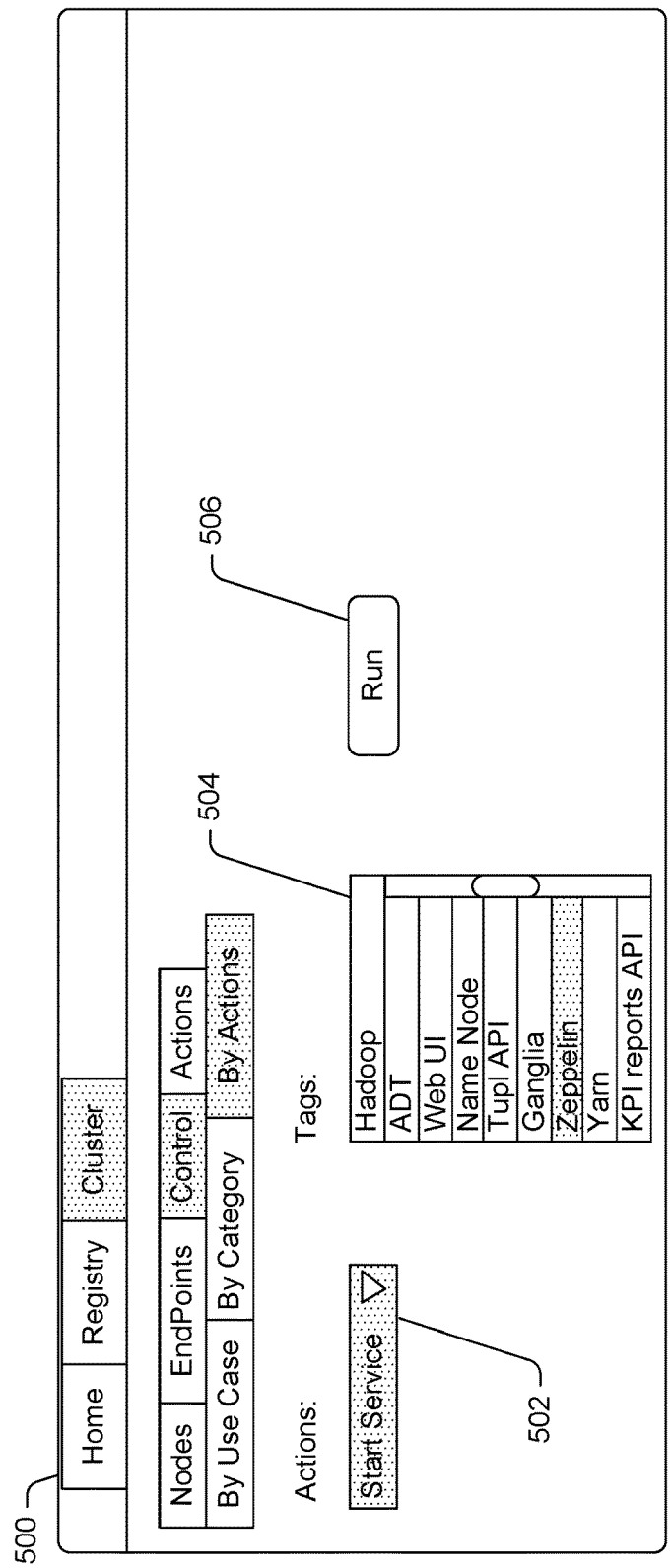
FIG. 5 is an illustrative user interface for initiating the execution of services and applications of a production image in a production environment.

FIG. 5 is an illustrative user interface 500 for initiating the execution of services and applications of a production image in a production environment. The user interface 500 may enable a user to control the execution of services and applications that reside in different software containers. In this way, the user interface 500 may be used to control the granularity at which services and applications are executed in a distributed manner. For example, the start services control 502 may be used to initiate services, and the tags control 504 may be used to select a specific type of services to execute via the activation of the run control 506.

Figure 6:
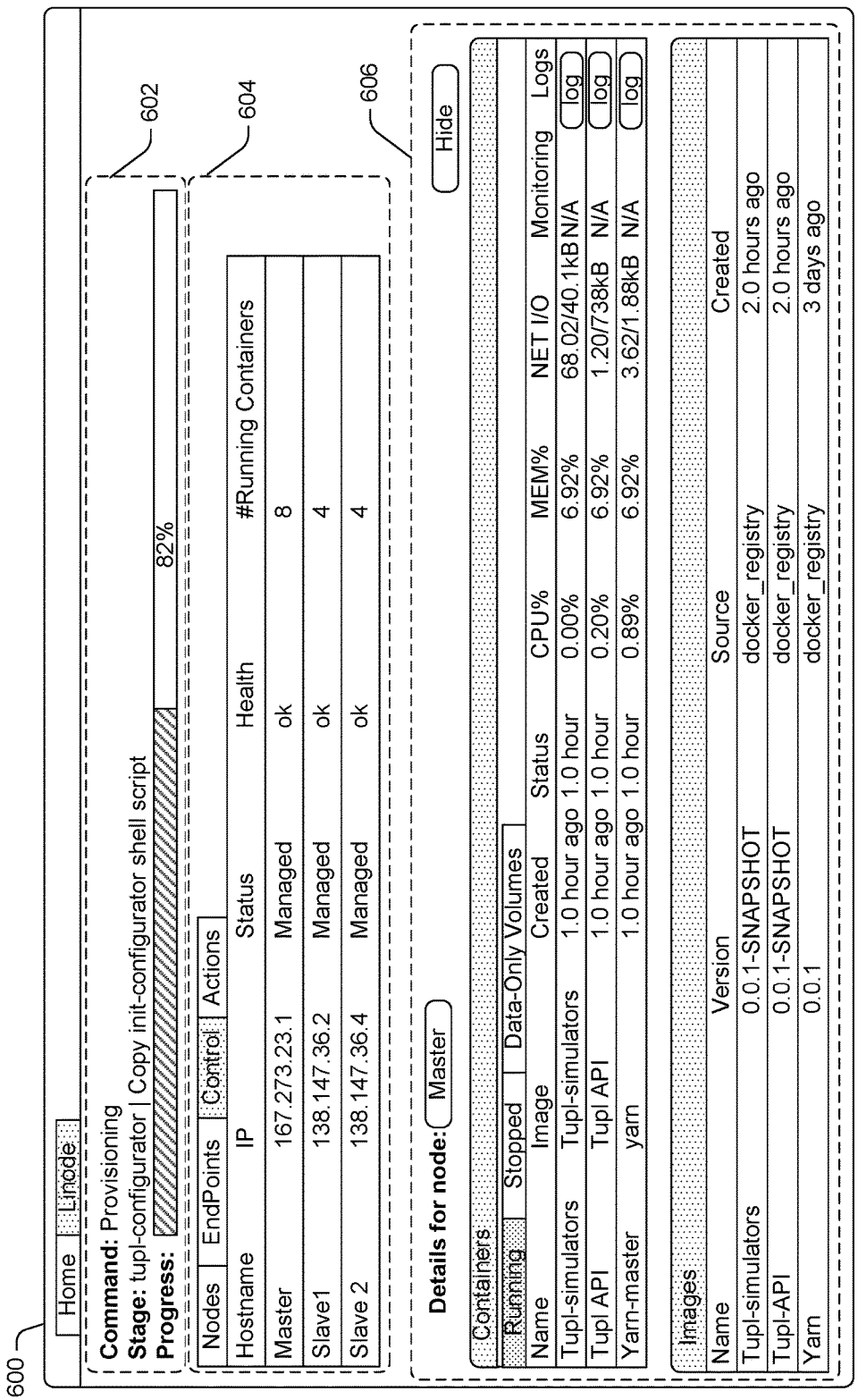
FIG. 6 is an illustrative user interface for monitoring progress during the deployment of a production image into a production environment.

FIG. 6 is an illustrative user interface 600 for monitoring progress during the deployment of a production image into a production environment. The user interface 600 may indicate the deployment progress in section 602. For example, the section 602 may display a progress bar that indicates the progression of the deployment. The user interface 600 may further include controls that enable a user to create computing nodes, provision the computing nodes, monitor the computing nodes, and initiate services for the deployment of the production image. For example, the user interface 600 may provide a node control section 604 that enables the user to view the computing nodes that are running the software containers of the production image. The user interface 600 may provide additional details regarding a computing node via a node detail section 606. As shown, once a specific computing node is selected, the node detail section 606 may show statistics for the software containers that are executing on the selected computing node. The node detail section 606 may further show information on the one or more production images that are executing on the selected computing node.

Example Processes

Figure 7:
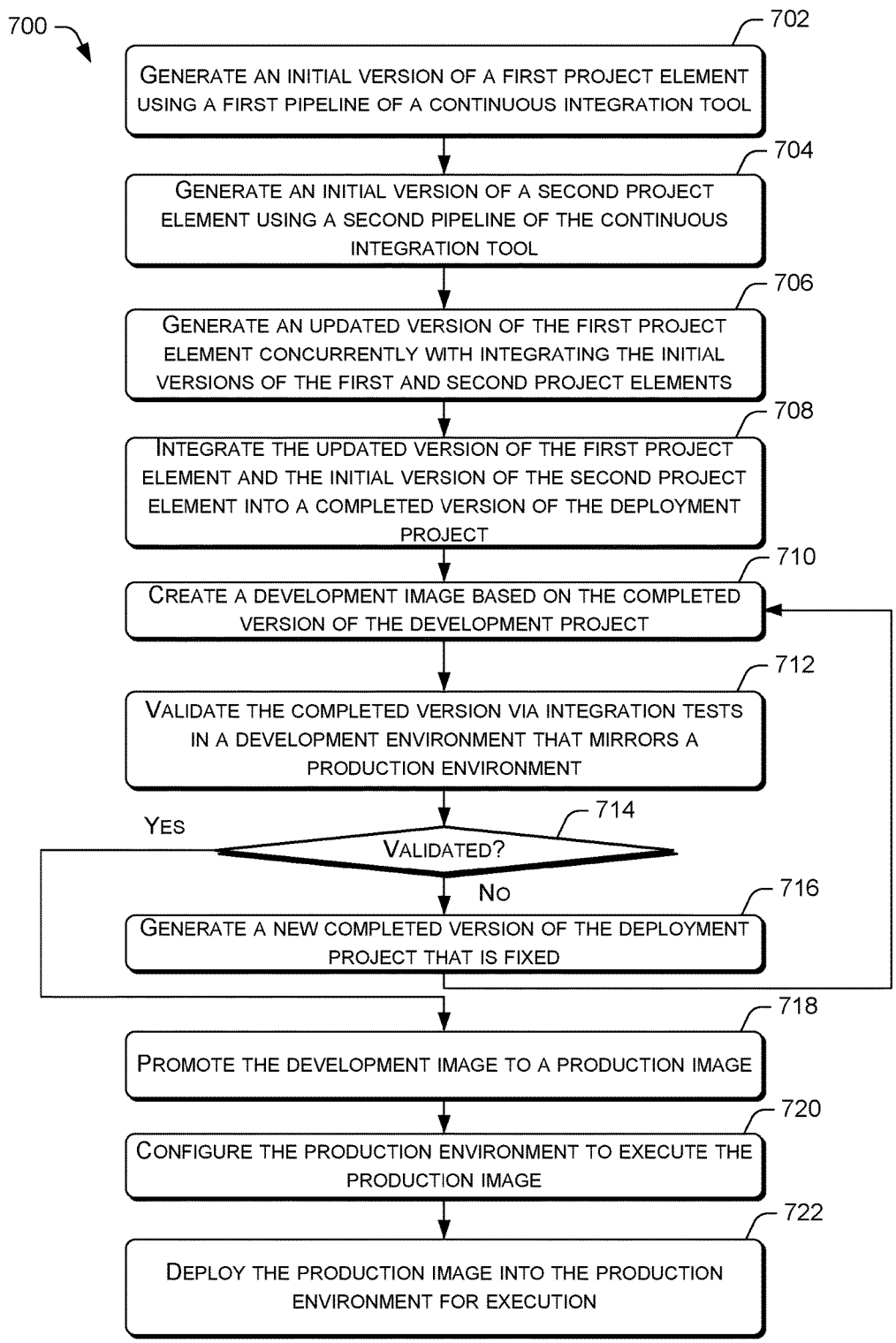
FIG. 7 is a flow diagram of an example process for performing continuous application development and automatic application deployment.
Figure 8:
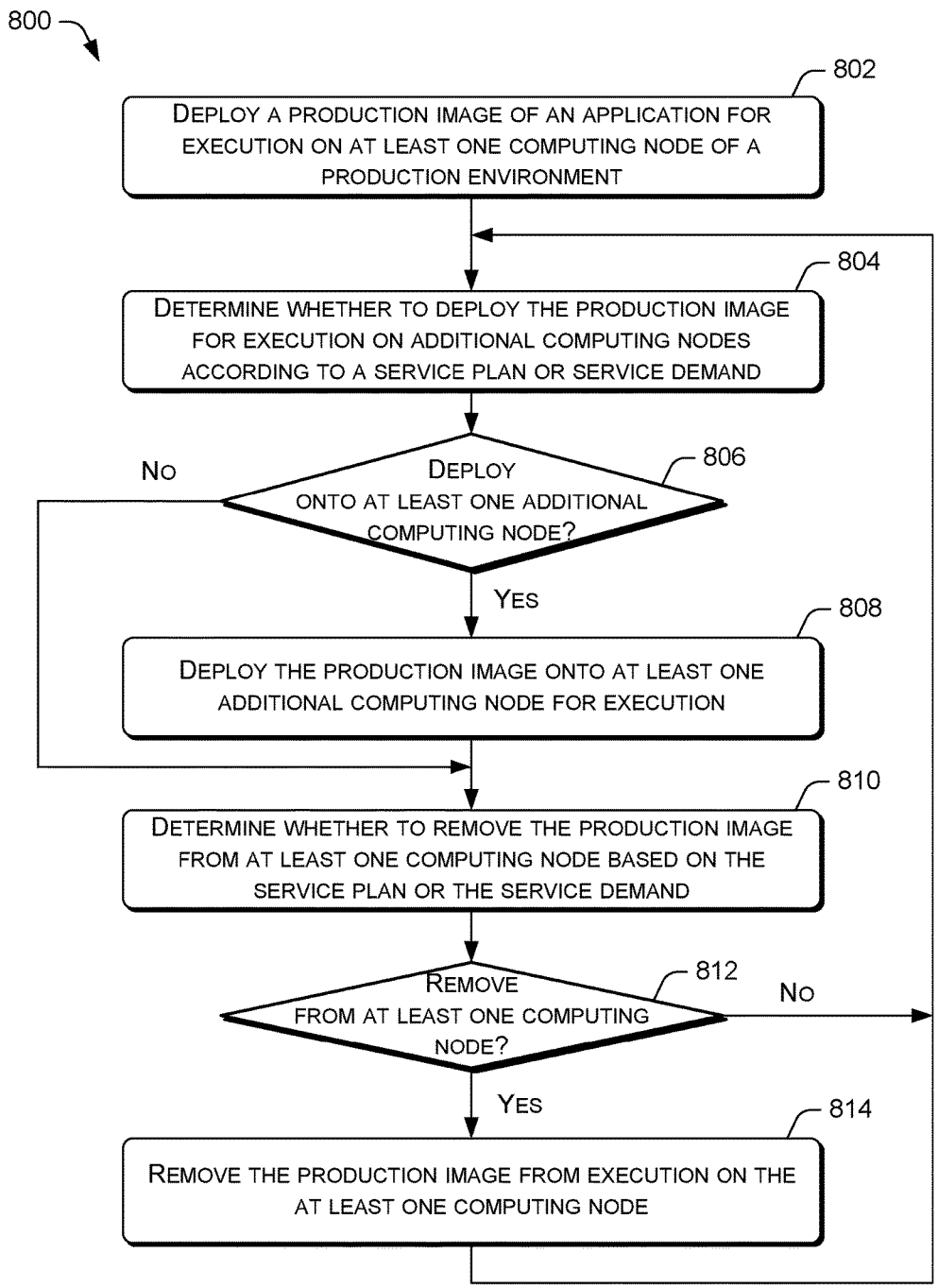
FIG. 8 is a flow diagram of an example process for performing automatic scaling of an application that is deployed via automatic application deployment according to a service plan or service demand.

FIGS. 7 and 8 present illustrative processes 700 and 800 for performing continuous application development and automatic application deployment. Each of the processes 700 and 800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in mirror to implement the process. For discussion purposes, the processes 700 and 800 are described with reference to the architecture 100 of FIG. 1.

FIG. 7 is a flow diagram of an example process 700 for performing continuous application development and automatic application deployment. At block 702, the continuous integration module 106 of the software development engine 102 may generate an initial version of a first project element for a deployment project, such as the deployment project 208, using a first pipeline. The first project element may be an application component, at least a portion of an application, or at least a portion of an infrastructure. The first pipeline may generate the initial version by compiling corresponding source code into the project element. The corresponding source code may be developed according to the project specifications for the deployment project.

At block 704, the continuous integration module 106 may generate an initial version of a second project element for the deployment project using a second pipeline. The second project element may be an application component, at least a portion of an application, or at least a portion of an infrastructure. The second pipeline may generate the initial version by compiling corresponding source code into the project element. The corresponding source code may be developed according to the project specifications for the deployment project.

At block 706, the continuous integration module 106 may generate an update version of the first project element while concurrently integrating the initial version of the first project element and the initial version of the second project element into an initial integrated version. Such concurrent operations are examples of non-linear application development via distributed revision control, as the multiple pipelines of the continuous integration module 106 may be executed in parallel. The first pipeline may generate the updated version by compiling corresponding updated source code into the project element. The continuous integration module 106 may use the integration pipeline 224 to integrate the initial versions of the first and second project elements.

At block 708, the continuous integration module 106 may integrate the updated version of the first project element and the initial version of the second project element into a completed version of the deployment project. The integration pipeline 224 may perform such integration under the command of a version controller of the continuous integration module 106. In some embodiments, the completer version of the deployment project may include other project elements. In some instances, the generated of the completed version via integration may be performed concurrently with the validation of the initial integrated version in the development environment using one or more integration tests.

At block 710, the continuous integration module 106 may create a development image based on the completed version of the development project. In various embodiments, the development image may be generated via an image pipeline. The development image may be suitable for execution on computing nodes that are in the form of virtual machines or software containers.

At block 712, the continuous integration module 106 may validate the completed version of the development project via one or more integration tests. The validation may be performed in a development environment that mirrors a production environment. The integration tests may be administered by an integration test pipeline of the continuous integration module 106. The integration tests may perform endurance, stress, and/or performance assessment on the completed version of the development project.

At decision block 714, if the continuous integration module 106 determines that the completed version is not validated by the one or more integration tests ("no" at decision block 714), the process 700 may proceed to block 716. At block 716, the continuous integration module 106 may generated a new completed version of the deployment project that is fixed. In various embodiments, the continuous integration module 106 may send a request for errors in the source code of the completed version to be remedied. In various embodiments, a software developer may use the development modules 108 of the software development engine 102 to modify the source code and remedy the errors in the source code. The modification may result in additional versions of the project elements, which are integrated by the continuous integration module 106 to generate the fixed version of the deployment project. The new completed version that is fixed may be a version of the deployment project that is validated by the one or more integration tests. Subsequently, the process 700 may loop back to block 710, so that the continuous integration module 106 may create another development image based on the new completed version of the development project that is fixed.

Returning to decision block 714, if the continuous integration module 106 of the software development engine 102 determines that the completed version is validated by passing the one or more integration tests ("yes" at decision block 714), the process 700 may proceed to block 718.

At block 718, the continuous integration module 106 may promote the development image to a production image. The production image is a copy of the development image that is designated by the continuous integration module 106 as ready for deployment into the production environment. The production image may be suitable for execution on computing nodes that are in the form of virtual machines or software containers.

At block 720, the software development engine 102 may configure the production environment to execute the production image. In various embodiments, an automatic deployment module 110 of the software development engine 102 may command the orchestration module 112 to perform the configuration. The orchestration module 112 may perform different orchestration tasks. Such tasks may include creating and provisioning computing nodes according to computing resource demand, booting up third-party services and applications, assign Internet Protocol (IP) addresses to access applications and data, mapping of slave computing nodes to host computing nodes, and/or so forth.

At block 722, the automatic deployment module 110 of the software development engine 102 may deploy the production image into the production environment for execution. The automatic deployment module 110 may perform the deployment by configuring multiple execution settings. For example, the execution settings may include the location of the repository where the production image is located, the amount of the computing and memory resources that are to be allocated for the execution of the development image in the production environment, the type and source of data to be processed using the production image, the set of actions to be performed on the source data by the production image, and/or other execution parameters for the development image.

FIG. 8 is a flow diagram of an example process 800 for performing automatic scaling of an application that is deployed via automatic application deployment according to a service plan or service demand. At block 802, the automatic deployment module 110 may deploy a production image of an application for execution on one or more computing nodes of a production environment. In various embodiments, the computing nodes may be in the form of virtual machines or software containers. A software container may be an isolated virtual user-space instance that may behave as a real server.

At block 804, the automatic deployment module 110 may determine whether to deploy the production image for execution on additional computing nodes according to a service plan or service demand. For example, the service plan may specify a particular data output response time, data output capacity over a time period, a task completion time, or other quality of service (QoS) parameters. Thus, the current execution of the production image on one or more computing nodes may be insufficient to meet the workload objectives of the service plan or service demand.

At decision block 806, if the automatic deployment module 110 determines that the production image is to be deployed onto at least one additional computing node ("yes" at decision block 806), the process 800 may proceed to block 808. At block 808, the automatic deployment module 110 may deploy the production image onto at least one additional computing node for execution. In various embodiments, the number of computing nodes to which the production image is deployed to may be automatically scaled to meet the service plan or service demand. Returning to decision block 806, if the automatic deployment module 110 determines that the production image is not to be deployed onto at least one additional computing node ("no" at decision block 806), the process 800 may proceed to block 810.

At block 810, the automatic deployment module 110 may determine whether to remove the production image from at least one computing node based on the service plan or the service demand. In various embodiments, the automatic deployment module 110 may detect reduced workload demand for executing the production image. The detection may be based on a reduction in the number of data processing requests in a particular time period, a reduction in incoming data, and/or so forth. For example, demand for the services provided by an application associated with the production image may be reduced during certain times of the day, week, month, etc.

At decision block 812, if the automatic deployment module 110 determines that the application is to be removed from at least one computing node ("yes" at decision block 812), the process 800 may proceed to block 814. At block 814, the automatic deployment module 110 may remove the production image from execution on the at least one computing node. In various embodiments, the automatic deployment module 110 may command the orchestration module 112 to terminate one or more computing nodes that are executing the production image to free up computing resources for performing other computing tasks. Subsequently, the process 800 may loop back to block 804. However, returning to decision block 812, if the automatic deployment module 110 determines that no application is to be removed from at least one computing node ("no" at decision block 812), the process 800 may directly loop back to block 804.

The techniques for continuous application development and automatic application deployment may integrate application development and deployment processes. Accordingly, the techniques may speed up an application development process. For example, by implementing continuous integration, the techniques may make it possible to reduce iteration time of application development. Further, the techniques may enable a software developer to test the features of a software solution in a development environment that mirrors a production environment for the deployment of the software solution. Thus, unexpected problems at the time of the deployment may be reduced or eliminated. Such reduction or elimination of unexpected deployment problems may be especially useful for the deployment of mission critical applications, such as applications that operate or manage telecommunication or utility infrastructures.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
one or more processors; and
memory including a plurality of computer-executable components, the plurality of computer-executable components comprising:
a continuous integration component that generates a completed version of a deployment project in a development environment by concurrently:
generating an updated second version of a first project element via a first pipeline, and
integrating, via an integration pipeline, a first version of the first project element with a first version of a second project element to generate the completed version,
wherein the integration pipeline performs the integrating under command of a version controller that tracks versions of applications, application components, and infrastructures to enable concurrent compilation and testing of multiple versions of the applications, application components, and infrastructures;
an orchestration component that configures a production environment that includes at least one computing node to execute a development image that is created from the completed version of the deployment project, the production environment being mirrored by the development environment; and
an automatic deployment component that deploys a production image that is a copy of the development image into the production environment for execution,
wherein the first project element or the second project element is one of an application component, at least one portion of an application, or at least one portion of an infrastructure that supports the execution of the application.

2. The system of claim 1, further comprising at least one of:
a development tool that receives source code for the first project element or the second project element;
a binary repository manager that manages one or more of distribution, revision, or release of binaries used to develop the deployment project; or
a project management component that schedules a development of source code for the first project element or the second project element of the deployment project.

3. The system of claim 1, wherein the continuous integration component further validates the completed version of the deployment project in the development environment via one or more integration tests that are provided by an integration test pipeline, and designates the development image as the production image in response to the completed version being validated by the one or more integration tests.

4. The system of claim 3, wherein, in response to the completed version being invalidated by the one or more integration tests, the continuous integration component further provides a notification to fix the completed version of the deployment project, and generates the development image based on a new completed version of the deployment project that is received in response to the notification.

5. The system of claim 3, wherein the one or more integration tests include at least one of a performance test, a stress test, or an endurance test of the completed version of the deployment project in the development environment using test data.

6. The system of claim 3, wherein an integration of initial versions of the first project element and the second project element generates an integrated version, and generating the completed version by the continuous integration component occurs concurrently with a validation of the integrated version using the one or more integration tests in the development environment.

7. The system of claim 1, wherein the first pipeline or the second pipeline is an application component pipeline that compiles component source code into the application component, an application pipeline that compiles application source code into the at least one portion of the application, or an infrastructure pipeline that compiles infrastructure source code into the at least one portion of the infrastructure.

8. The system of claim 1, wherein the infrastructure includes one or more of an operating system, a peripheral application, or an application execution platform.

9. The system of claim 1, wherein the automatic deployment component is to deploy the development image into the production environment in response to one or more execution settings.

10. The system of claim 1, wherein the production image is configured to execute on a computing node in a form of a software container, the production image includes one or more application components, one or more applications, and the infrastructure that supports the execution of the application.

11. The system of claim 1, wherein the orchestration components performs tasks that includes at least one of creating and provisioning computing nodes according to computing resource demand, booting up third-party services and applications, assign Internet Protocol (IP) addresses to access applications and data, mapping of slave computing nodes to host computing nodes.

12. The system of claim 1, wherein the automatic deployment component is to deploy the production image onto one or more additional computing nodes in response to an increase in a workload due to a service demand or a service plan, or remove the production image from a least one computing node in response to a decrease in the workload due to the service demand or the service plan.

13. One or more non-transitory computer-readable media storing computer-executable instructions that upon execution cause one or more processors to perform acts comprising:
generating an initial version of a first project element using a first pipeline, the first pipeline compiling the initial version of the first project element from first corresponding source code that is developed according to project specifications of a deployment project;
generating an initial version of a second project element using a second pipeline, the second pipeline compiling the initial version of the second project element from second corresponding source code that is developed according to the project specifications of the deployment project;
concurrently performing:
generating an updated version of the first project element using the first pipeline, and
integrating, via an integration pipeline, the initial version of the first project element and the initial version of the second project element into a completed version of the deployment project, wherein the integration pipeline performs the integrating under command of a version controller that tracks versions of applications, application components, and infrastructures to enable concurrent compilation and testing of multiple versions of the applications, application components, and infrastructures;
creating a development image based on the completed version of the deployment project in response to the completed version being valid;
designating the development image as a production image in response to determining via one or more integration tests that the completed version of the deployment project is valid, the one or more integration tests being performed in a development environment that mirrors a production environment;
configuring the production environment that includes at least one computing node to execute the production image; and
deploying the production image into the production environment for execution,
wherein the first project element or the second project element is one of an application component, at least one portion of an application or at least one portion of an infrastructure that supports the execution of the application.

14. The one or more non-transitory computer-readable media of claim 13, wherein the acts further comprise deploying the production image onto one or more additional computing nodes in response to an increase in a workload due to a service demand or a service plan, or removing the production image from a least one computing node in response to a decrease in the workload due to the service demand or the service plan.

15. The one or more non-transitory computer-readable media of claim 13, wherein the acts further comprise creating an additional development image based on the completed version of the deployment project for deployment into an additional production environment that differs from the production environment.

16. The one or more non-transitory computer-readable media of claim 13, wherein the first pipeline or the second pipeline is an application component pipeline that compiles component source code into the application component, an application pipeline that compiles application source code into the at least one portion of the application, or an infrastructure pipeline that compiles infrastructure source code into the at least one portion of the infrastructure.

17. The one or more non-transitory computer-readable media of claim 13, wherein the production image is configured to execute on a computing node in a form of a software container, the production image includes one or more application components, one or more applications, and the infrastructure that supports the execution of the application.

18. The one or more non-transitory computer-readable media of claim 13, wherein the deploying includes deploying the development image into the production environment for execution as the production image in response to one or more execution settings.

19. A computer-implemented method, comprising:
generating an initial version of a first project element using a first pipeline, the first pipeline compiling the initial version of the first project element from first corresponding source code that is developed according to project specifications of a deployment project;
generating an initial version of a second project element using a second pipeline, the second pipeline compiling the initial version of the second project element from second corresponding source code that is developed according to the project specifications of the deployment project;

concurrently performing:
   generating an updated version of the first project element using the first pipeline, and
   integrating, via an integration pipeline, the initial version of the first project element and the initial version of the second project element into a completed version of the deployment project, wherein the integration pipeline performs the integrating under command of a version controller that tracks versions of applications, application components, and infrastructures to enable concurrent compilation and testing of multiple versions of the applications, application components, and infrastructures;

creating a development image based on the completed version of the deployment project;

designating the development image as a production image for deployment into a production environment;

configuring the production environment that includes at least one computing node to execute the production image; and deploying the production image into the production environment for execution, wherein the first project element or the second project element is one of an application component, at least one portion of an application or at least one portion of an infrastructure that supports the execution of the application.

20. The computer-implemented method of claim 19, further comprising determining via one or more integration tests that the completed version of the deployment project is valid, the one or more integration tests being performed in a development environment that mirrors the production environment, and wherein the designation includes designating the development image as the production image in response to the completed version being valid.

21. The computer-implemented method of claim 19, further comprising deploying the production image onto one or more additional computing nodes in response to an increase in a workload due to a service demand or a service plan, or removing the production image from a least one computing node in response to a decrease in workload due to the service demand or the service plan.

22. The computer-implemented method of claim 19, wherein the first pipeline or the second pipeline is an application component pipeline that compiles component source code into the application component, an application pipeline that compiles application source code into the at least one portion of the application, or an infrastructure pipeline that compiles infrastructure source code into the at least one portion of the infrastructure.

23. The computer-implemented method of claim 19, wherein the production image is configured to execute on a computing node in a form of a software container, the production image includes one or more application components, one or more applications, and the infrastructure that supports the execution of the application.

24. The computer-implemented method of claim 19, wherein the deploying includes deploying the development image into the production environment for execution as the production image in response to one or more execution settings.

\* \* \* \* \*